United States Patent
Tosini

(10) Patent No.: US 12,459,626 B2
(45) Date of Patent: Nov. 4, 2025

(54) MEMBER FOR SUPPORTING A DRIVING STEERING WHEEL

(71) Applicant: IFRA S.R.L., Ferrara (IT)

(72) Inventor: Paolo Tosini, Ferrara (IT)

(73) Assignee: IFRA S.R.L., Ferrara (IT)

( * ) Notice: Subject to any disclaimer, the term of this patent is extended or adjusted under 35 U.S.C. 154(b) by 1007 days.

(21) Appl. No.: 17/616,079

(22) PCT Filed: Oct. 19, 2021

(86) PCT No.: PCT/IB2021/059624
§ 371 (c)(1),
(2) Date: Dec. 2, 2021

(87) PCT Pub. No.: WO2022/248928
PCT Pub. Date: Dec. 1, 2022

(65) Prior Publication Data
US 2023/0211864 A1    Jul. 6, 2023

(30) Foreign Application Priority Data
May 26, 2021   (IT) .................. 102021000013751

(51) Int. Cl.
*B63H 25/02*    (2006.01)

(52) U.S. Cl.
CPC ....... *B63H 25/02* (2013.01); *B63H 2025/022* (2013.01)

(58) Field of Classification Search
CPC .......................... B63H 25/02; B63H 2025/022
See application file for complete search history.

(56) References Cited

U.S. PATENT DOCUMENTS

| | | | | |
|---|---|---|---|---|
| 1,891,208 A | * | 12/1932 | Schuetz ............... | B63H 25/10 74/480 B |
| 4,759,235 A | * | 7/1988 | Hiramitsu ............ | B62D 1/105 74/484 R |
| 7,302,899 B2 | * | 12/2007 | Zeiger ................. | B63H 25/02 280/775 |
| 2005/0252433 A1 | * | 11/2005 | Gai ..................... | B63H 25/02 114/144 R |

FOREIGN PATENT DOCUMENTS

IT    BO20120535 A1    4/2014
WO    WO-2017216702 A1 * 12/2017 ............. B62D 1/105

OTHER PUBLICATIONS

Italian Search Report dated Feb. 10, 2022 from counterpart Italian Patent Application No. 102021000013751.

* cited by examiner

*Primary Examiner* — S. Joseph Morano
*Assistant Examiner* — Jovon E Hayes
(74) *Attorney, Agent, or Firm* — SHUTTLEWORTH & INGERSOLL, PLC; Timothy J. Klima

(57) ABSTRACT

A member for supporting a vehicle or watercraft steering wheel, the member including a fixed support device, firmly connected in rotation, to said vehicle, or watercraft, and a device supporting the steering wheel that is rotatable with the steering wheel and connected to a device for transmission of rotation of the steering wheel towards, or to, a device for directing said vehicle, or watercraft, and a device that carries an aid device to the pilot of the vehicle, or watercraft. The carrying device is in a fixed, or firm, condition, in rotation with respect to the steering wheel, so as to allow an easy operation or displaying of the aid device for any position taken by the steering wheel.

20 Claims, 13 Drawing Sheets

MEMBER FOR SUPPORTING A DRIVING STEERING WHEEL

This application is the National Phase of International Application PCT/IB2021/059624 filed Oct. 19, 2021 which designated the U.S.

This application claims priority to Italian Patent Application No. 102021000013751 filed May 26, 2021, which application is incorporated by reference herein.

APPLICATION FIELD OF THE PRESENT INVENTION

The present invention relates to a member for supporting a driving steering wheel.

STATE OF THE ART

Members for supporting a driving steering wheel for driving corresponding means for directing a vehicle, especially a corresponding watercraft steering wheel or directing paddle of a corresponding watercraft, such as a yacht or the like, are known.

Said known members generally comprise fixed support means, which are firmly connected in rotation, to said vehicle, or watercraft, of the means for supporting said driving steering wheel that are movable, in particular rotatable, therewith and that are connected to corresponding means for the transmission of motion, or rotation, of said driving steering wheel towards, or to, means for directing said vehicle, or watercraft, as well as means carrying corresponding means that aid the pilot of said vehicle, or watercraft, in particular comprising means for controlling corresponding operating means of said vehicle, or watercraft, or of corresponding accessory devices thereof, e.g. a radio or other, i.e., a central disc bearing a corresponding design, possibly illuminated or illuminable, in particular defining a corresponding logo or mark, or bearing a corresponding displaying display, e.g. of corresponding controls of said vehicle, or watercraft, or other. Said means that support corresponding means that aid the pilot of said vehicle, or watercraft, are in a fixed or stationary condition, in rotation with respect to said driving steering wheel, so as to allow an easy operation or displaying of said means that aid the pilot of said vehicle, or watercraft, for any position taken by said driving steering wheel.

However, these already-known support members of the steering wheel are not of a sufficiently robust structure and are subject to not infrequent and undesirable breakages.

Furthermore, these-already known support members of the steering wheel, in particular because of their complexity, are intended to be of a rather rigid construction, i.e., they are not adjustable by the user in order to place the same steering wheel in a position that suits his or her characteristics and wishes.

SUMMARY OF THE INVENTION

Therefore, the present invention is aimed to propose a new and alternative solution to the solutions known up to now, and in particular to obviate one or more of the drawbacks or problems referred to above and/or to satisfy one or more of the needs referred to above, and/or in any case felt in the art, and in particular deducible from what is reported above.

Thus, a member is provided for supporting a driving steering wheel, in particular for driving corresponding means for directing a vehicle, especially a corresponding watercraft steering wheel or directing paddle of a corresponding watercraft, preferably in the form of a yacht or the like; said member comprises fixed support means, which are firmly connected in rotation, to said vehicle, or watercraft, means for supporting said driving steering wheel which are movable, in particular rotatable, with said driving steering wheel and which are connected to means for the transmission of motion, or rotation, of said driving steering wheel towards, or to, means for directing said vehicle, or watercraft, and means carrying corresponding means that aid the pilot of said vehicle, or watercraft, which means bearing corresponding means that aid the pilot of said vehicle or watercraft are in a fixed, or stationary, condition, in rotation with respect to said driving steering wheel, so as to allow an easy operation or displaying of said means that aid the pilot of said vehicle or watercraft for any position taken by said driving steering wheel; characterized in that said fixed support means comprise a corresponding part, in particular axially extended, which is adapted to support said rotatable means for supporting said driving steering wheel and/or said means supporting corresponding means that aid the pilot of said vehicle, or watercraft.

In this way, a single and robust structure for the present support member can be obtained.

BRIEF DESCRIPTION OF THE DRAWINGS

This and other innovative aspects, or respective advantageous implementation, are in any case set forth in the attached claims, the specific technical features of which can be found, together with corresponding advantages achieved, in the following description, illustrating in detail a purely exemplary and non-limiting embodiment of the invention, and which is made with reference to the attached drawings, in which:

Figure 1:
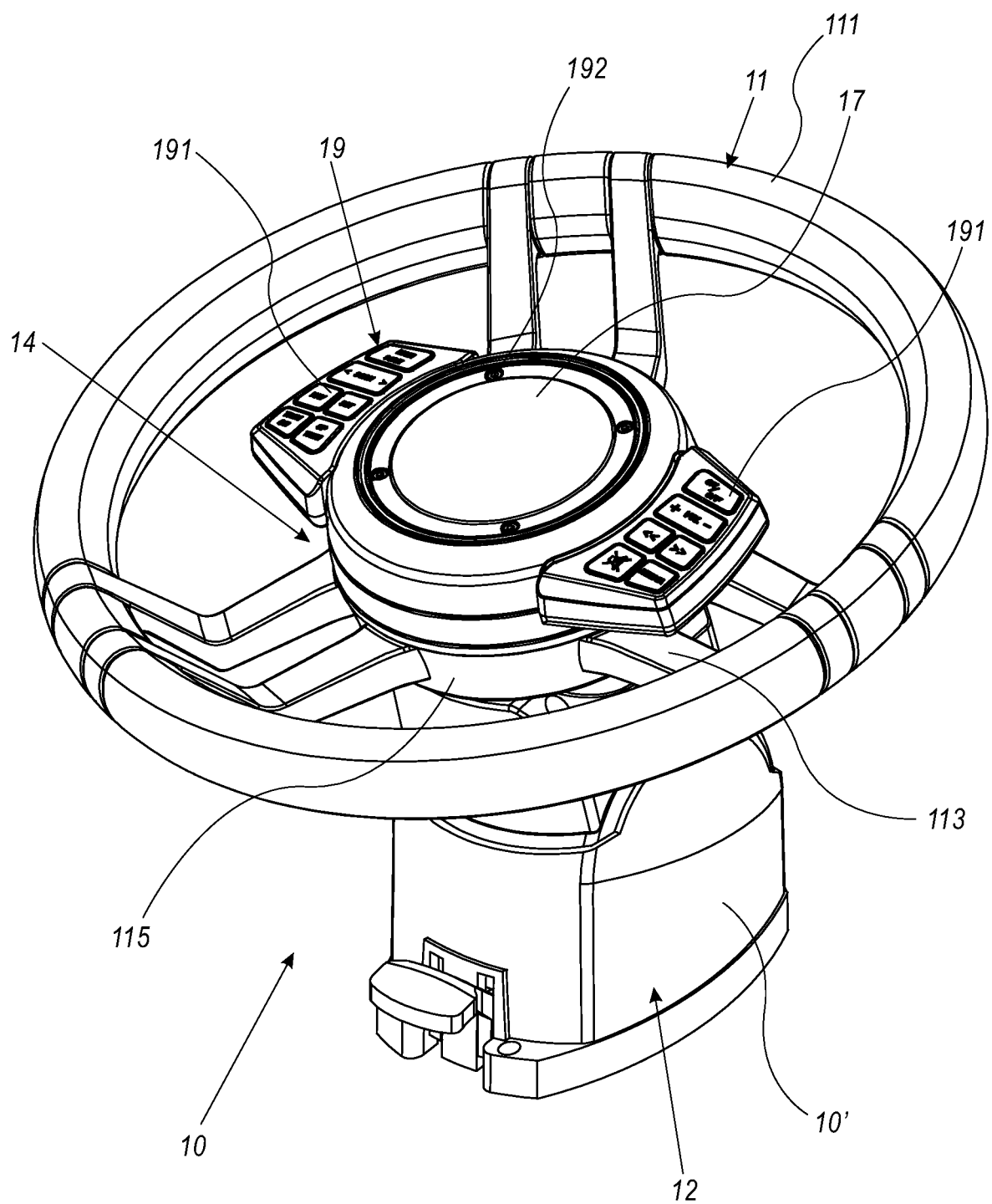
FIG. 1 illustrates a schematic perspective view of a preferred embodiment of a member according to the present invention, with said driving steering wheel in an assembled condition.
Figure 2:
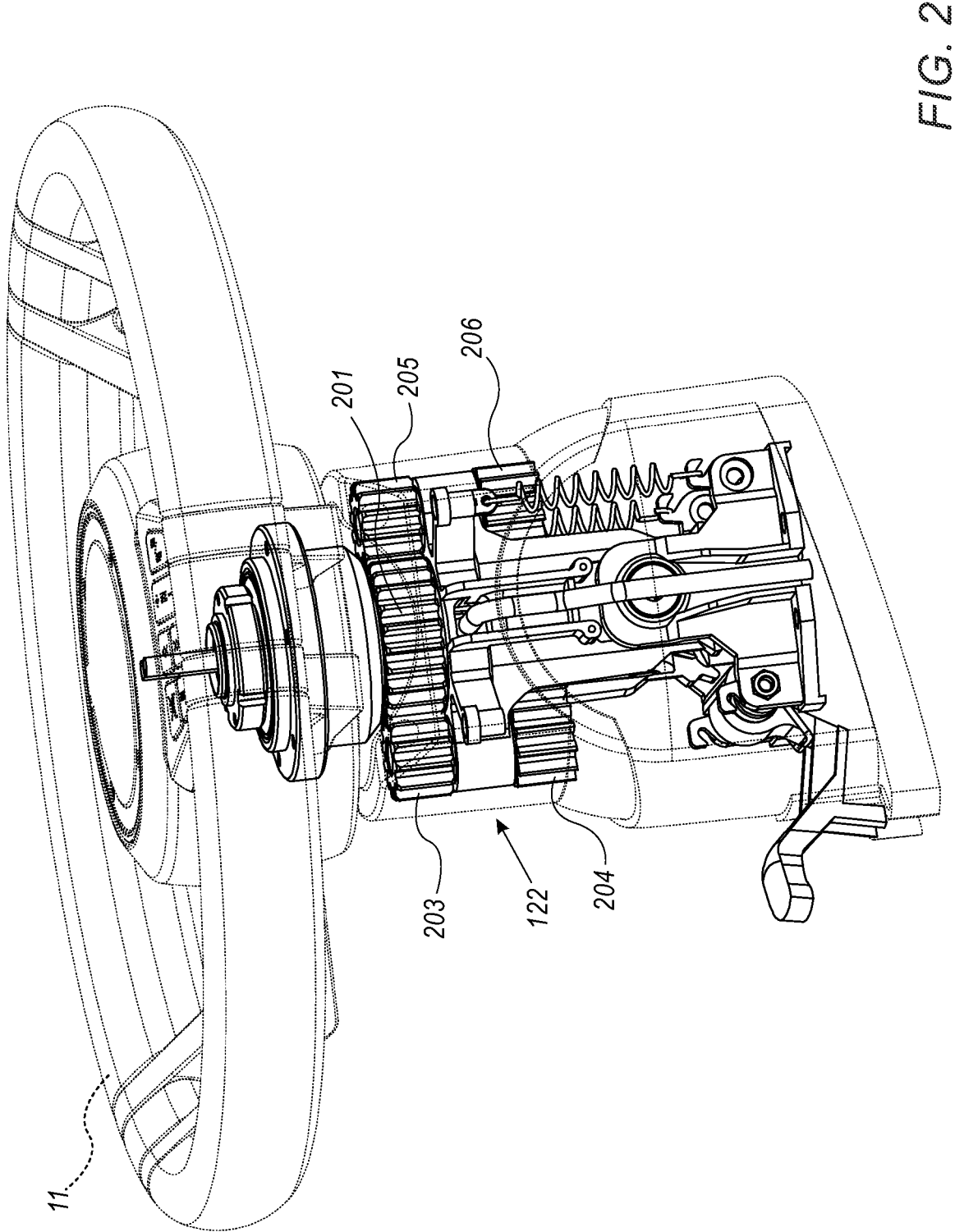
FIG. 2 illustrates a schematic perspective side view of the preferred embodiment of a member according to the present invention.
Figure 3:
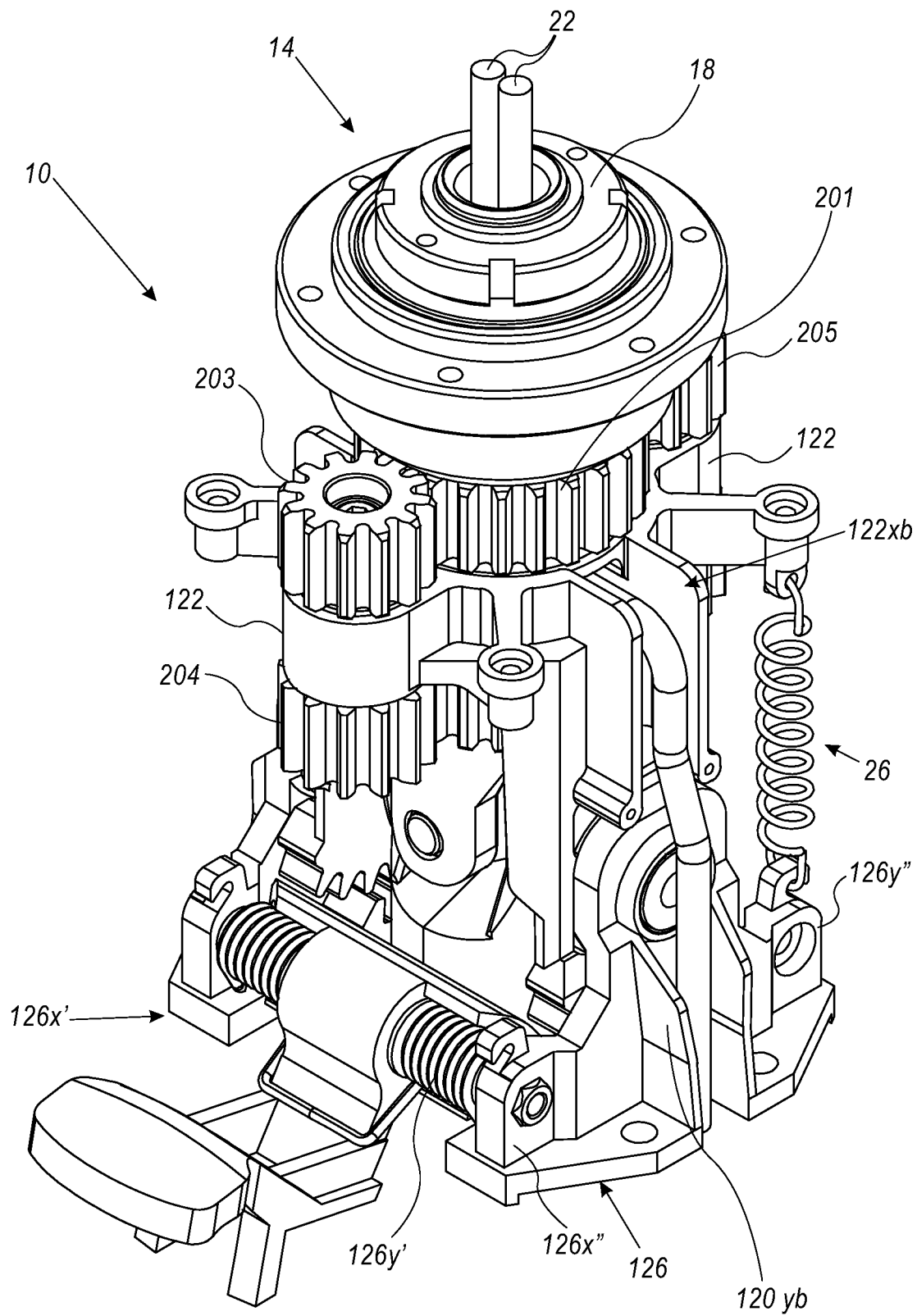
FIG. 3 illustrates a schematic perspective view of the preferred embodiment of a member according to the present invention.
Figure 4A:
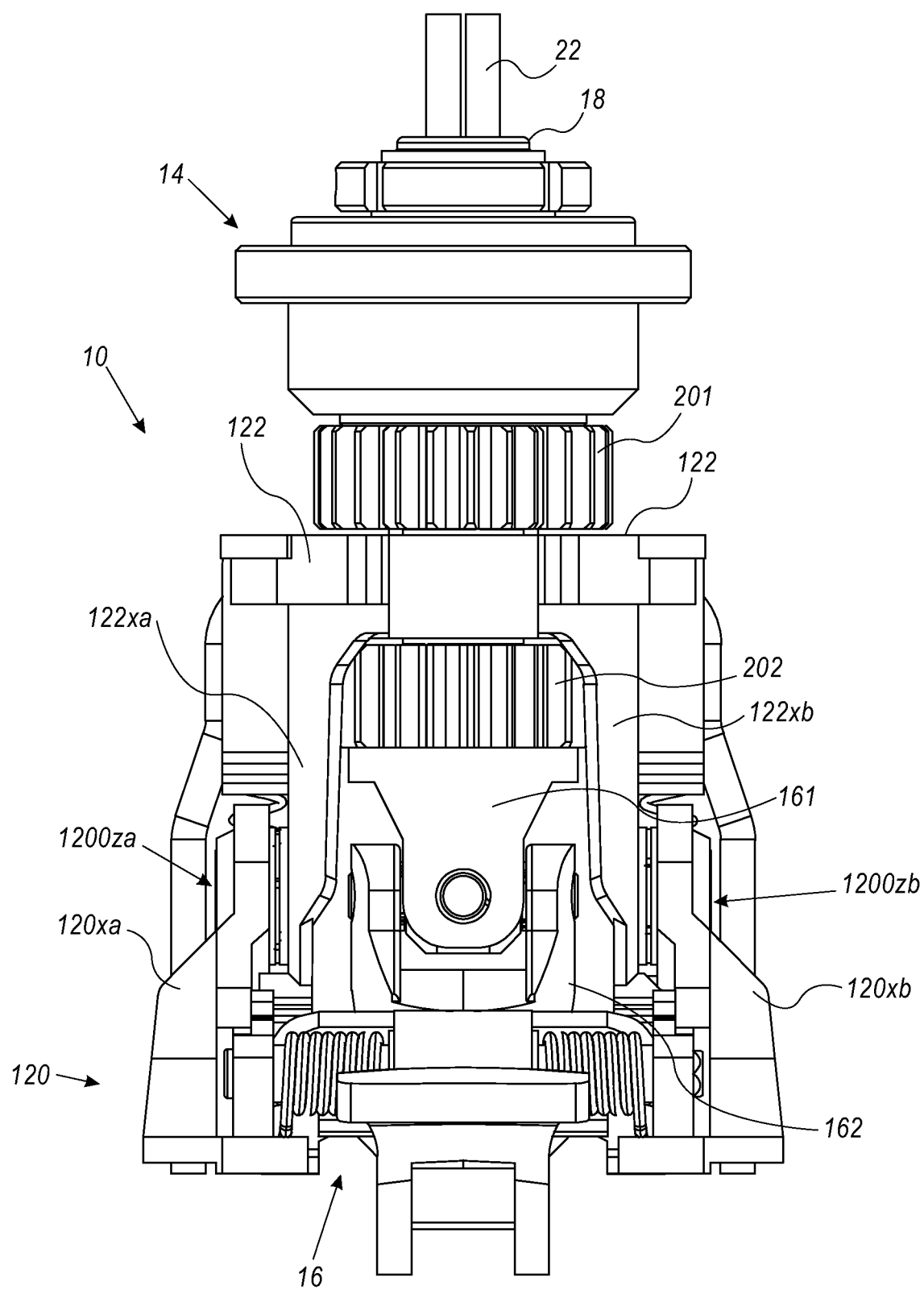
FIG. 4A illustrates a schematic front elevation view of the preferred embodiment of a member according to the present invention.
Figure 4B:
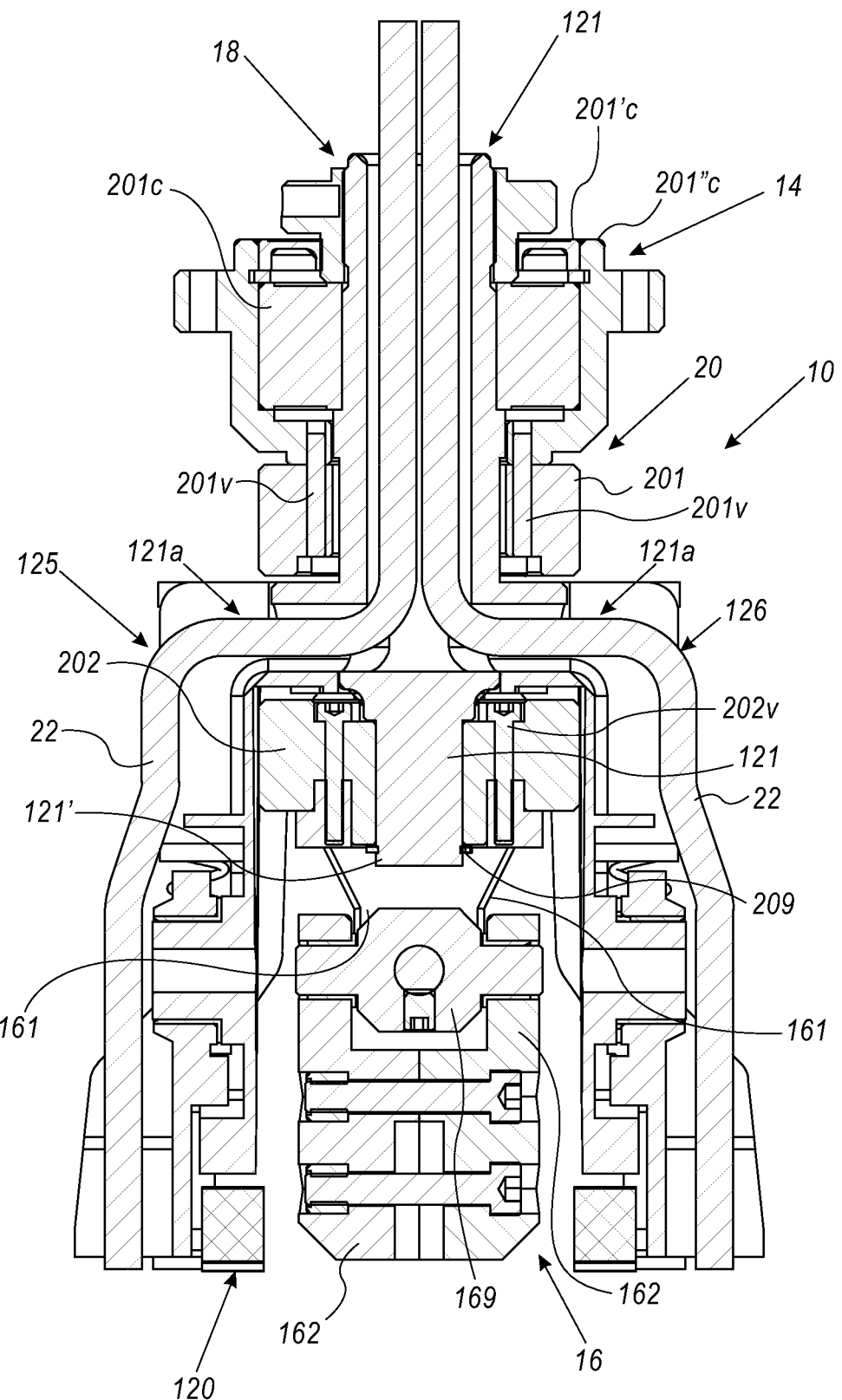
FIG. 4B illustrates a schematic cross-sectional view of the preferred embodiment of a member according to the present invention.
Figure 5A:
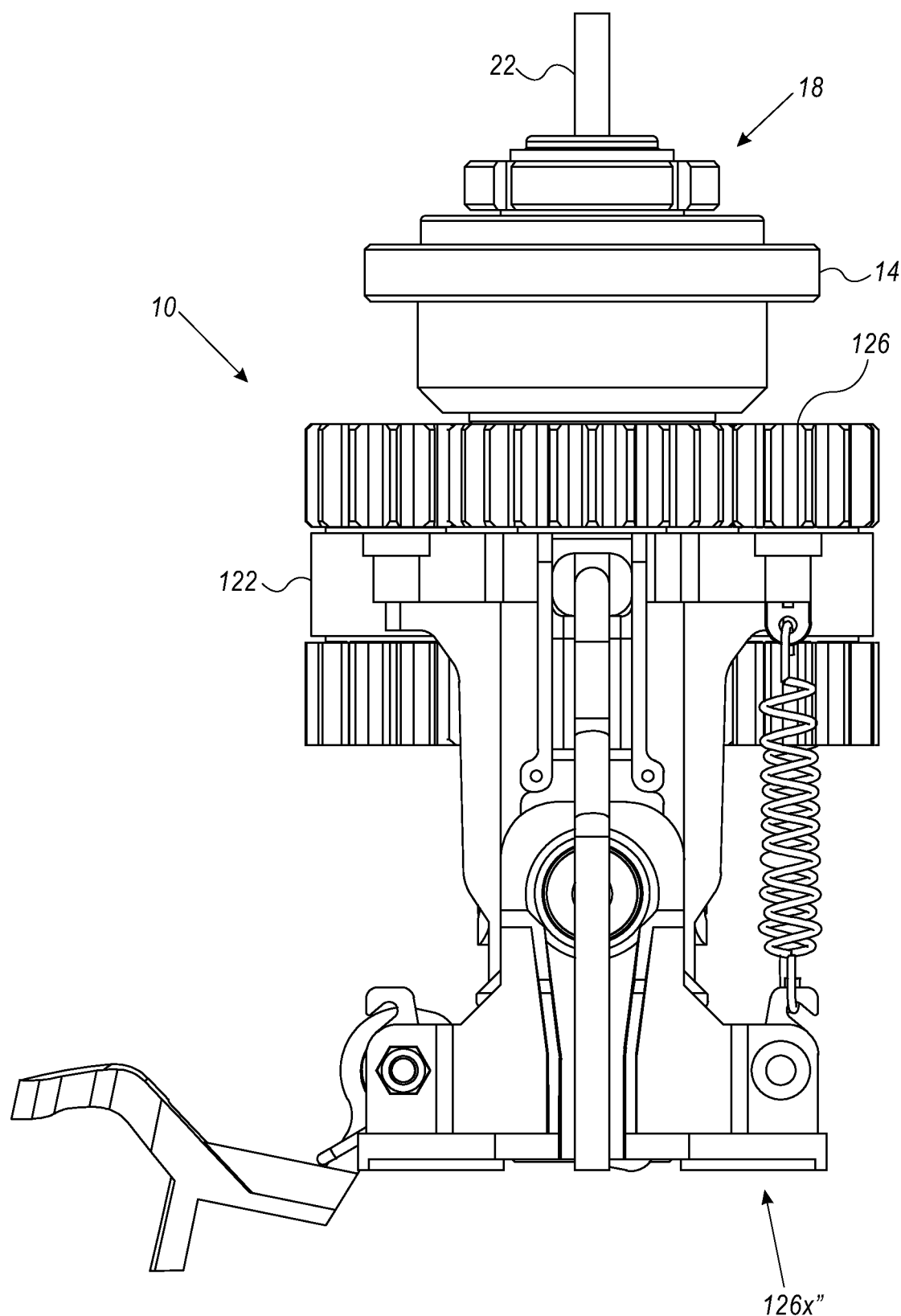
FIG. 5A illustrates a schematic elevated side view of the preferred embodiment of a member according to the present invention.
Figure 5B:
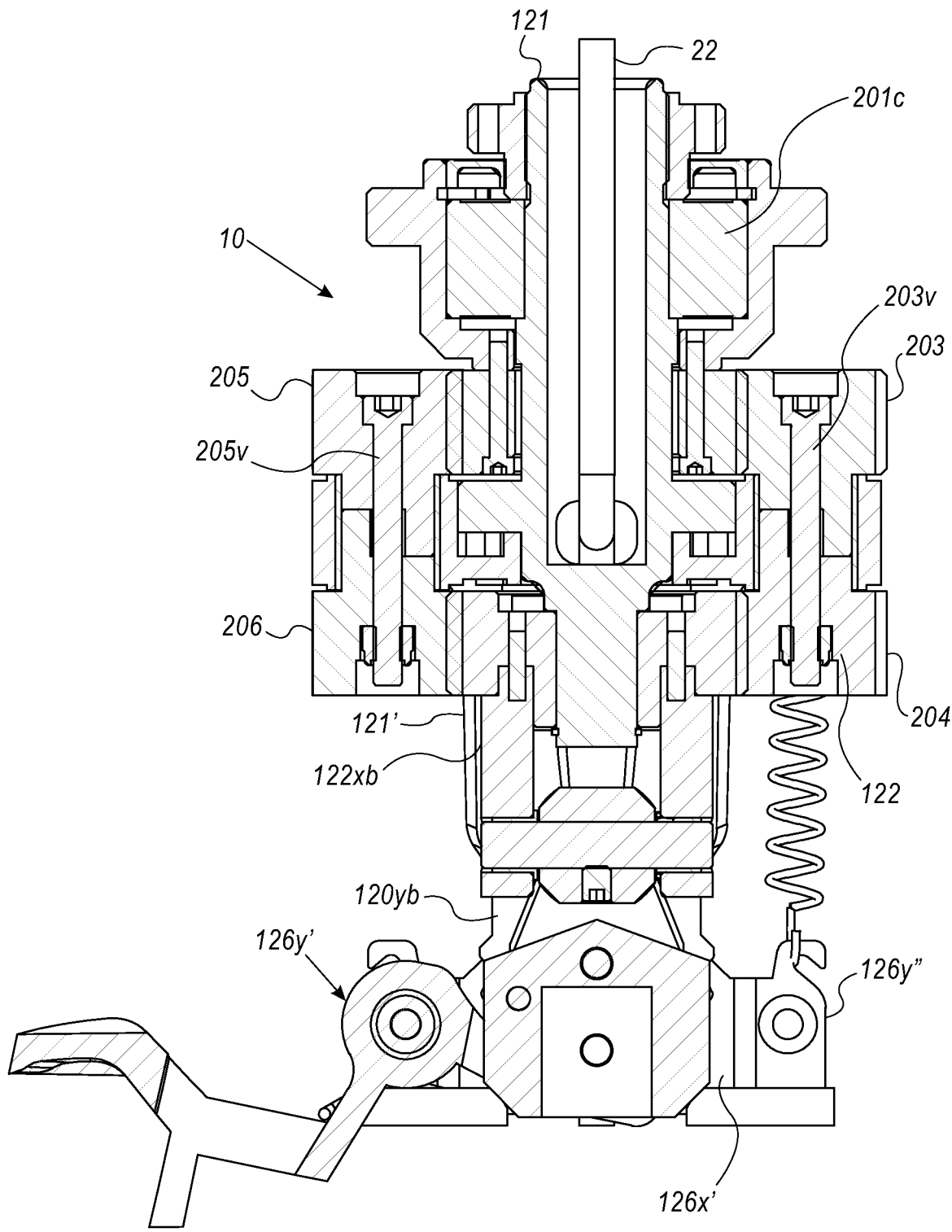
FIG. 5B illustrates a schematic longitudinal sectional view of the preferred embodiment of a member according to the present invention.
Figure 6A:
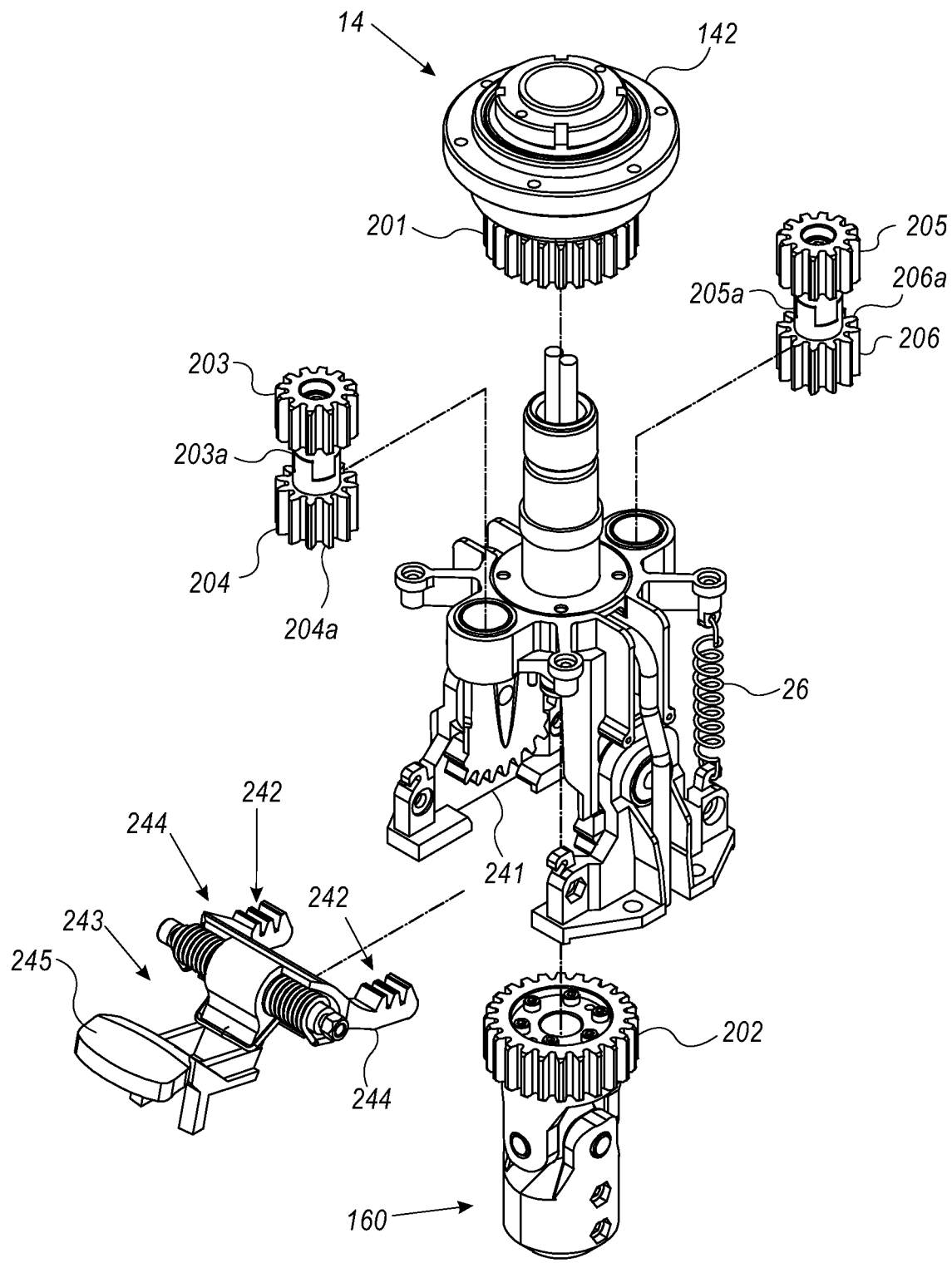
FIG. 6A illustrates a schematic view in exploded perspective of the preferred embodiment of a member according to the present invention.
Figure 6B:
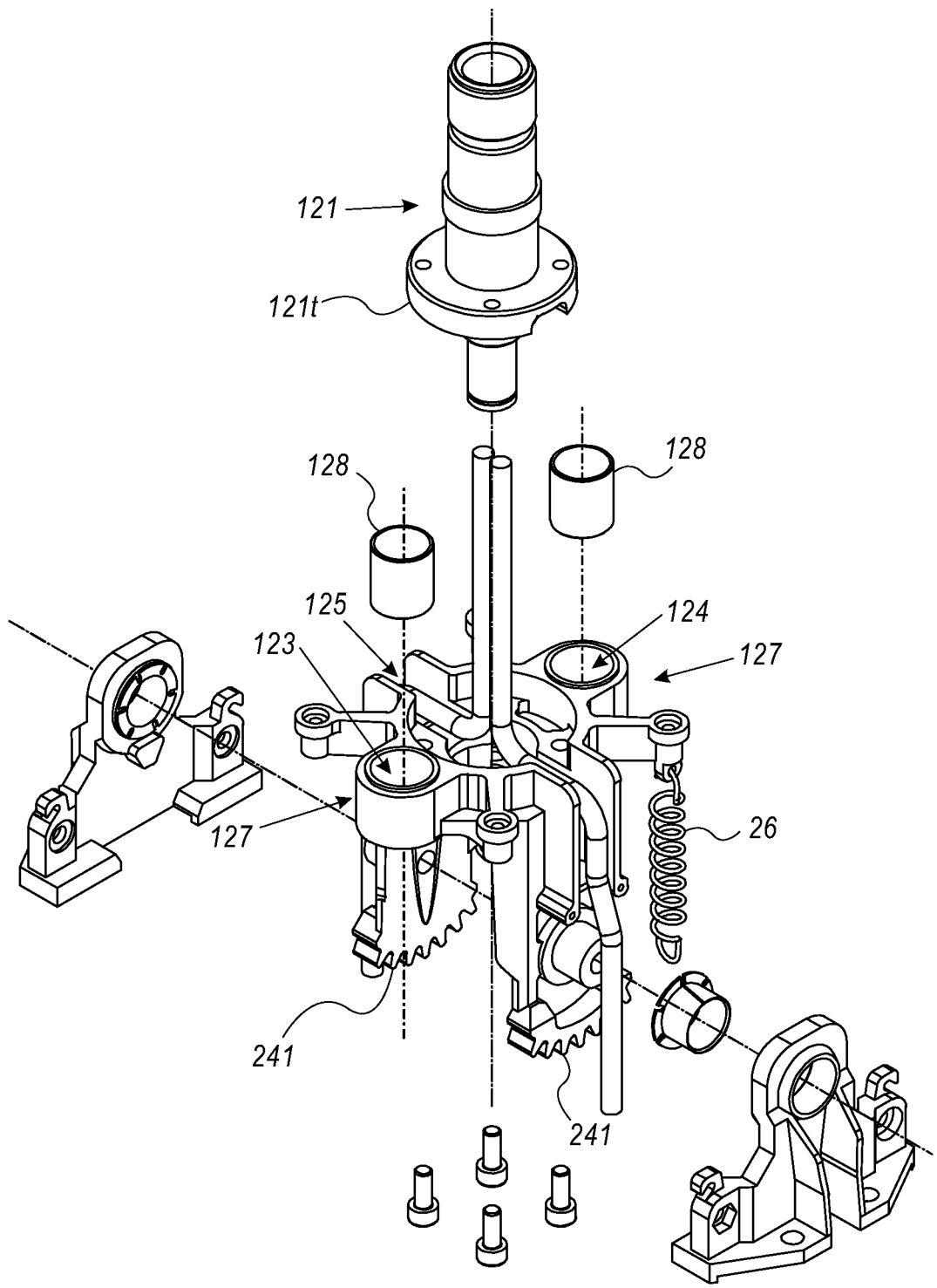
FIG. 6B illustrates a second schematic view in exploded perspective of the preferred embodiment of a member according to the present invention.

DETAILED DESCRIPTION OF PREFERRED
EMBODIMENTS OF THE INVENTION

In the attached Figures, a preferred embodiment 10 of a member for supporting a driving steering wheel 11, in particular a driving steering wheel for corresponding means for directing a vehicle, especially a corresponding watercraft steering wheel or directing paddle of a corresponding watercraft, which preferably is in the form of a yacht or the like, is illustrated.

The driving steering wheel 11 comprises, as illustrated, a perimetrically extended handle 111, which is connected via corresponding spokes, in particular radially extended spokes 113, to a corresponding central hub 115 in turn connected to or carried by the present member 10.

As illustrated, the member 10 comprises fixed support means 12, firmly connected in rotation, to said vehicle, or watercraft, and means 14 for supporting said driving steering wheel 11 that are movable, in particular rotatable, with said driving steering wheel and that are connected to means 16 for the transmission of motion, or rotation, of said driving steering wheel 11 towards, or to, means for directing said vehicle, or watercraft.

As illustrated, the organ 10 comprises means 18 carrying corresponding means 19 that aid the pilot of said vehicle, or watercraft, and in particular comprising means 191 for controlling corresponding operating means of said vehicle, or watercraft, or controlling corresponding accessory devices thereof, e.g. a radio or other, and a central disc 192 bearing a corresponding design, possibly illuminated or illuminable, in particular defining a corresponding logo or mark, or bearing a corresponding displaying display, e.g. of corresponding controls of said vehicle, or watercraft, or other.

As illustrated, the means 18 that support the corresponding means 19 that aid the pilot of said vehicle, or watercraft are in a fixed or stationary condition, in rotation with respect to said driving steering wheel 11, so as to allow an easy operation or displaying of said means 19 that aid the pilot of said vehicle, or watercraft, for any position taken by said driving steering wheel 11.

In particular, as illustrated, said control means 191 of corresponding operating means radially extend, protruding from said central disc 192, in particular protruding from opposite transverse sides thereof.

With advantage, as illustrated, said fixed support means 12 comprise a corresponding part, in particular axially extended 121, which is adapted to support said rotatable means 14 for supporting said driving steering wheel 11 and/or said means 18 carrying corresponding means 19 that aid the pilot of said vehicle, or watercraft.

In this way, a simple and robust structure for the present support member 10 can be obtained.

Advantageously, as can be seen from said Figures, in the present member means 20 are provided for transferring the motion, or rotation, of said driving steering wheel 11 to said means 16 for the transmission of motion, or rotation, of said driving steering wheel 11 towards, or to, means for directing said vehicle, or watercraft.

In a particularly advantageous manner, as can be seen from said figures, said means 20 for transferring the motion, or rotation, of said driving steering wheel 11 to said means 16 for the transmission of motion, or rotation, of said driving steering wheel 11 towards, or to, means for directing said vehicle, or watercraft, are supported, in a freely movable manner, by said fixed support means 12, in particular by said axially extended part 121.

Advantageously, as can be seen from said figures, said means 20 for transferring the motion, or rotation, of said driving steering wheel 11 to said means 16 for the transmission of motion, or rotation, of said driving steering wheel 11 towards, or to, means for directing said vehicle, or watercraft, are in the form of corresponding gearwheel means 21, 22, 23, 24, 25, 26.

As can be seen from said figures, advantageously, said means 20 for transferring the motion, or rotation, of said driving steering wheel 11 to said means 16 for the transmission of motion, or rotation, of said driving steering wheel 11 towards, or to, means for directing said vehicle, or watercraft comprise a primary gear 201 that receives the movement, or is directly connected, to said driving steering wheel 11, i.e., to said movable or rotatable means 14 for supporting said driving steering wheel 11, in particular through corresponding enlarged-head fastening screws 201v which fit into corresponding holes provided on said primary gear 201 and on said movable or rotatable means 14 for supporting said driving steering wheel 11.

In an significantly advantageous manner, as can be seen from said figures, said primary gear 201 of said means 20 for transferring the motion, or rotation, of said driving steering wheel 11 to said means 16 for the transmission of motion, or rotation, of said driving steering wheel 11, is rotatable with respect to a respective axis coinciding with the axis of said member 10 and/or with the axis of rotation of said driving steering wheel 11, i.e., of said movable or rotatable means 14 for supporting said driving steering wheel 11, preferably with the axis of said axially extended part 121.

In a particularly advantageous manner, as can be seen from said figures, said means 20 for transferring the motion, or rotation, of said driving steering wheel 11 to said means 16 for the transmission of motion, or rotation, of said driving steering wheel 11 towards, or to, means for directing said vehicle, or watercraft, comprise an end gear 202 that imparts the movement, or is directly connected, to said means 16 for the transmission of motion, or rotation, of said driving steering wheel 11 towards, or to, means for directing said vehicle, or watercraft, in particular through corresponding enlarged-head fastening screws 202v which insert into corresponding holes provided for on said end gear 202 and on said means 16 for the transmission of motion, or rotation, of said driving steering wheel 11 towards, or to, means for directing said vehicle, or watercraft.

As can be seen from said figures, advantageously, said end gear 202 of said means 20 for transferring the motion, or rotation, of said driving steering wheel 11 to said means 16 for the transmission of motion, or rotation, of said steering wheel 11, is rotatable with respect to a respective axis coinciding with the axis of said member 10 and/or with the axis of rotation of said driving steering wheel 11, i.e., of said movable or rotatable means 14 for supporting said driving steering wheel 11, and/or with axis of rotation of said means 16 for the transmission of motion, or rotation, of said driving steering wheel towards, or to, means for directing said vehicle, or watercraft, i.e., at least with the part thereof to which said end gear 202 is directly connected, preferably with the axis of said axially extended part 121.

With significant advantage, as can be seen from said figures, said means 20 for transferring the motion, or rotation, of said driving steering wheel 11 to said means 16 for the transmission of motion, or rotation, of said driving steering wheel 11 towards, or to, means for directing said vehicle, or watercraft, comprise corresponding means 203, 204, 205, 206 for transferring the movement, or rotation, of said primary gear 201 to said end gear 202.

In a significantly advantageous way, as can be seen from said figures, said means for transferring the movement from said primary gear 201 to said end gear 202 comprise at least one upstream gear 203 or 205 in operative, in particular meshing, connection, with said primary gear 201, and at least one downstream gear 204 or 206 in operative, in particular meshing, connection, with said end gear 202.

As illustrated, said upstream gear 203 and downstream gear 204 are operatively connected, in particular integrally connected, to one another, preferably through a corresponding integral, or firm in rotation, connection, in particular through a corresponding fastening screw 203v or 205v, which fits into corresponding holes provided for in said upstream gear 203 or 205 and downstream gear 204 or 206, to transfer the rotation imparted by said driving steering wheel 11 to said primary gear 201, to said end gear 202 and then to said means 16 for the transmission of motion, or rotation, of said driving steering wheel 11 towards, or to, means for directing said vehicle, or watercraft. As illustrated, the corresponding fastening screw 203v or 205v is blocked at its end by a corresponding nut 203d, 205d.

Furthermore, in particular, as illustrated, said upstream gear 203 and downstream gear 204 are operatively connected to each other, through corresponding tooth means 203i, 204i and/or 205i, 206im, protruding longitudinally from the respective upstream gear 203 and/or 205 and downstream gear 204 and/or 206 and mutually meshing with each other to transmit a corresponding rotation, in a respective angular direction or in the opposite angular direction.

As can be seen from said Figures, advantageously, said means for transferring the movement from said primary gear 201 to said end gear 202 comprise a plurality, in particular a first and second, upstream gears 203, 205 in operative connection, in particular meshing, with said primary gear 201, and a plurality, in particular a first and a second downstream gears 204, 206, in operative connection, in particular meshing, with said end gear 202.

As illustrated, said pairs of respective upstream and downstream gears 203, 204 and 205, 206, which are operatively connected, in particular integrally connected, to each other, preferably through a corresponding integral, or firm in rotation, connection are angularly spaced from each other, in particular angularly spaced by 180°, in particular being provided at respective opposite sides with said primary gear 201 and end gear 202.

With advantage, as can be seen from said Figures, said means for transferring the movement from said primary gear 201 to said end gear 202, i.e., the respective upstream gear 203 or 205 in operative, in particular meshing, connection with said primary gear 201, and the corresponding downstream gear 204 or 206 in operative, in particular meshing, connection with said end gear 202, are rotatable with respect to a corresponding longitudinal axis parallel to the rotational axis of said primary gear 201 and/or of said end gear 202, i.e., rotatable with respect to the axis of the member 10 and/or to the rotational axis of said driving steering wheel 11, i.e., of said movable or rotatable means 14 for supporting the same driving steering wheel 11, and/or the rotational axis of said means 16 for the transmission of the motion, or rotation, of said driving steering wheel 11 towards, or to, means for directing said vehicle, or watercraft, i.e., at least to the part thereof to which said end gear 202 is directly connected.

In practice, as can be seen from said figures, said means 203, 204, 205, 206 for transferring the movement, or rotation, from said primary gear 201 to said end gear 202, are provided peripherally to the same primary gear 201 and end gear 202.

With significant advantage, as can be seen from said figures, said axially extended part 121 of said fixed support means 12, which is adapted to support said rotatable means 14 for supporting said driving steering wheel 11 and/or said means 18 carrying corresponding means 19 that aid the pilot of said vehicle, or watercraft, supports in a freely rotatable manner said primary gear 201 of said means 20 for transferring the motion, or rotation, of said driving steering wheel 11 to said means 16 for the transmission of motion, or rotation, of said driving steering wheel 11 towards, or to, means for directing said vehicle, or watercraft, in particular through a corresponding bearing 201c, which will be better illustrated below by the following description.

As can be seen from said figures, advantageously, said movable or rotatable means 14 for supporting said driving steering wheel 11 are in the form of a flanged body 141, to which the driving steering wheel 11 is fixed through corresponding screws, not particularly illustrated in the attached figures, which insert into corresponding holes 142 opening in the upper surface of the same flanged body 141, which flanged body 141 is rotatably supported by said axially extended part 121 of said fixed support means 12 through a corresponding bearing 201c, which is coaxially mounted on the same axially extended part 121 and which bearing 201c supports, also, in a freely rotatable manner said primary gear 201 in a fixed condition to said flanged body 141.

Advantageously, as can be seen from said figures, said means 18 carrying corresponding means 19 that aid the pilot of said vehicle, or watercraft are clamped on said axially extended part 121 of said fixed support means 12.

With advantage, as can be seen from said Figures, said means 18 carrying corresponding means 19 that aid the pilot of said vehicle, or watercraft, are superiorly positioned to said movable or rotatable means 14 for supporting said driving steering wheel 11, i.e., to the corresponding bearing 201c for the rotatable support thereof, and/or to said primary gear 201, of said means 20 for transferring the motion, or rotation, of said driving steering wheel 11 to said means 16 for the transmission of motion, or rotation, of said driving steering wheel 11 towards, or to, means for directing said vehicle, or watercraft.

As can be seen from said Figures, advantageously, said primary gear 201 is coaxially arranged to said axially extended part 121, in particular below the movable or rotatable means 14 for supporting said driving steering wheel 11, i.e., the corresponding bearing 201c for a rotatable support thereof.

In a particularly advantageous manner, as can be seen from said figures, said axially extended part 121 supports, in particular at the respective lower end, in a slidable manner, especially with friction, said end gear 202 of said means 20 for transferring the motion, or rotation, of said driving steering wheel 11 to said means 16 for the transmission of motion, or rotation, of said driving steering wheel 11 towards, or to, means for directing said vehicle, or watercraft. In particular, as it will be seen below in the following description, said end gear 202 is arranged below a transversally extended part 122 of the same fixed support means 12.

Advantageously, as can be seen from said Figures, the axially extended part 121 is internally hollow, i.e., it is in the form of a tubular body, and it is adapted to allow the inner passage of corresponding electrical and/or data transmission cables 22 for the connection of said means 19 that aid the pilot of said vehicle, or watercraft to a corresponding operative or working unit, in particular for power supply, or data treatment, or other.

As can be seen from said figures, in practice, said axially extended part 121 is in the form of a generally cylindrical body, in particular, as referred to, on the external surface of which are connected, in particular in decreasing sequence, said means 18 carrying corresponding means 19 that aid the pilot of said vehicle, or watercraft, said movable or rotatable means 14 for supporting said driving steering wheel 11, said movable or rotatable means 14 for supporting said driving steering wheel 11, i.e., the corresponding bearing 201c for the rotatable support thereof, and coaxially arranged to the respective external surface, said primary gear 201 of said means 20 for transferring the motion, or rotation, of said driving steering wheel 11 to said means 16 for the transmission of motion, or rotation, of said driving steering wheel 11 towards, or to, means for directing said vehicle, or watercraft.

As can be seen from said figures, advantageously, said axially extended part 121 is superiorly open for the escape towards said means 19 that aid the pilot of said vehicle, or watercraft, and/or is laterally open, in particular having a first and a second opposite openings 121a, 121a, for the passage to the outside of said electrical and/or data transmission cables 22 for connecting said means 19 that aid the pilot of said vehicle, or watercraft, to a corresponding operative or working unit.

In a significantly advantageous way, as can be seen from said figures, said fixed support means 12 comprise a transversally extended part 122, defining corresponding support, and/or connecting, means for said axially extended part 121 of the same fixed support means.

In a particularly advantageous manner, as can be seen from said figures, said axially extended part 121 has a flange-like enlarged portion 121t, in particular peripherally extending from said tubular body 121, which is adapted to engage with a respective receiving seat 122s provided in said transversally extended part 122, and to which it is attached through corresponding fastening screws 1212v.

As can be seen from said Figures, advantageously, said transversally extended part 122 is centrally perforated, in 125, to allow the passing through of a corresponding lower portion 121' of said axially extended part 121, in particular said through hole 125 being provided at said receiving seat 122s provided with said transversally extended part 122.

With significant advantage, as can be seen from said Figures, in practice, said fixed support means 12 comprise a transversally extended part 122, which comprises means 125, 126 for the passage of corresponding electrical and/or data transmission cables 22 for connecting said means 19 that aid the pilot of said vehicle, or watercraft to a corresponding operative or working unit.

In a significantly advantageous way, as can be seen from said Figures, said means 125, 126 for the passage of corresponding electrical or data transmission cables comprise a corresponding channel, in particular a first and a second opposite side channels 125, 126, for housing corresponding electrical or data transmission cables, which have a corresponding horizontal length from which a subsequent perpendicular length extends, in particular extending downwardly.

As can be seen from said Figures, advantageously, in practice, said fixed support means 12 comprise a transversally extended part 122, defining corresponding freely rotatable support means for said upstream gear 203 and/or 205 and downstream gear 204 and/or 206, of said means for transferring the movement, or rotation from said primary gear 201 to said end gear 202.

As can be seen from said Figures, in a significantly advantageous way, said transversally extended part 122 slidably supports corresponding parts for the mutual connection of said upstream gear 203 and/or 205 and downstream gear 204 and/or 206 of said means for transferring the movement, or rotation, from said primary gear 201 to said end gear 202, in particular at projecting wings 127, 127, in particular aligned to one another according to a respective direction.

With significant advantage, as can be seen from said figures, said transversally extended part 122 has a corresponding seat, in particular a first and a second seats 123, 124, in particular axially extending, for a slidable housing, through a corresponding respective bushing 128, 128, of corresponding projecting portions 203a and/or 205a and 204a and/or 206a for the mutual connection of said upstream gear 203 and/or 205 and downstream gear 204 and/or 206, of said means for transferring the movement, or rotation, from said primary gear 201 to said end gear 202.

As can be seen from said figures, advantageously, said first and second opposite side channels 125, 126, for housing corresponding electrical or data transmission cables, are angularly alternated to said seats 127, 127 for a slidable housing of corresponding portions 203a and/or 205a and 204a and/or 206a for the mutual connection of said upstream gear 203 and/or 205 and downstream gear 204 and/or 206, of said means for transferring the movement, or rotation, from said primary gear 201 to said end gear 202. In particular said side channels 125, 126, for housing corresponding electrical or data transmission cables, and said seats 127, 127, for a slidable housing of corresponding portions 203a and/or 205a and 204a and/or 206a for the mutual connection of said upstream gear 203 and/or 205 and downstream gear 204 and/or 206, are mutually angularly spaced apart by 90° one from the other.

As can be seen from said figures, with significant advantage, retaining means 209, in particular in the axial direction, of said end gear 202 on said axially extended part 121, in particular on the lower end 121' thereof are provided.

With advantage, as can be seen from said figures, said retaining means 209, in particular in the axial direction, of, in particular on the lower end 121' thereof, comprise a corresponding Seeger ring which engages the end, in particular the lower end, of said axially extended part 121 and which axially or perpendicularly retains said end gear 202, engaging the lower surface or face thereof.

As can be seen from said figures, advantageously, said support means fixed in rotation 12 comprise first support means 120 that are fixed, or integral, to said vehicle, or watercraft, i.e., to a corresponding portion or surface thereof, and second means 121, 122 that are movable in a tiltable manner in a plurality of operative positions, in particular respectively selectable by the pilot of said vehicle, or watercraft, with respect to said first means 120 that are fixed, or integral, to said vehicle, or watercraft.

In this way, the position of the driving steering wheel can be adjusted, in particular by tilting it appropriately in relation to the driver of the vehicle or watercraft.

As can be seen from said figures, with advantage, said second support means 121, 122 that are movable in a tiltable manner in a plurality of operative positions, in particular respectively selectable by the pilot of said vehicle, or watercraft, comprise said transversally extended part 122 and said, from this range, axially extended part 121 of the same fixed support means 12.

Advantageously, as can be seen from said figures, from said transversely extended part 122, in particular perpendicularly, preferably from the respective transversal ends thereof, corresponding first and second arms 122xa, 122xb extend, which are adapted to connect to said first support means 120 integral with the vehicle, or watercraft, i.e., to corresponding first and second column elements 120ya, 120yb thereof, to which they are pivoted through corresponding articulation pins 1200za, 1200zb, which insert in corresponding holes of said first support means 120, with the interposition of corresponding sliding bushings 1221, 1221.

As can be seen from said figures, advantageously, said second support means 121, 122 are rotatable, or tilting according to a corresponding horizontal or substantially horizontal axis, in relation to said first support means 120 that are fixed to, or integral with, said vehicle, or watercraft.

As can be seen from said figures, advantageously, said support means 120 integral with the vehicle, or watercraft, of said fixed support means in rotation 12 comprise a base 126, in particular comprising a first and a second struts 126x', 126x" from which, preferably upwards, in particular perpendicularly, said first and second column elements 120ya, 120yb extend for the articulation for said first and second arms 122xa, 122xa of said second means 121, 122 movable in a tilting way with respect to the same supporting means 120 integral with the vehicle, or watercraft.

In a particularly advantageous manner, as can be seen from said figures, said base 126 comprises a first and a second transverse members 126y', 126y" that extend, in an integral manner, between said first and second struts 126x', 126x" of the same base 126.

As can be seen from said figures, advantageously, said base 126, in particular said first and second struts 126x', 126x" of the same base 126, comprise corresponding channel means 126x''', 126x''', in particular perpendicular, for the passage of said electrical and/or data transmission cables 22 for the connection of said means 19 that aid the pilot of said vehicle, or watercraft to a corresponding operative or working unit.

As can be seen from said figures, in a particularly advantageous manner, corresponding means are provided, or may be provided, for stopping the tilting of said second means 121, 122 that are movable, in a tilting manner, with respect to said support means 120 integral to the vehicle, or watercraft, in particular said stopping means operating at both extreme angular positions, respectively, of the forward and backward movement of said second means movable in a tilting manner 121, 122.

In a significantly advantageous way, as can be seen from said figures, means 24 are provided for retaining said second means 121, 122 movable in a tilting manner in a plurality of operative positions, in particular respectively selectable by the pilot of said vehicle, or watercraft in a corresponding angular position with respect to said support means 120 integral to said vehicle, or watercraft, which said retention means 24 are in the form of retention means of an engageable and disengageable type.

As can be seen from said figures, advantageously, said retention means 24 of said second support means 122 that support in a freely rotatable manner said means 14 for supporting said driving steering wheel 11, in a corresponding operating position, comprise respective rack means 241 cooperating with corresponding tooth means 242 for respectively locking and unlocking the tilting of said second means 121, 122 movable in a tilting manner with respect to said support means 120 integral to the vehicle, or watercraft.

As can be seen from said figures, in a significantly advantageous way, said rack means 241, comprise one, in particular a first and a second arched racks 241, 241 and/or are provided on one of, in particular on both, said first and second arms 122xa, 122xb extending from said transversely extended part 122, preferably, as illustrated, at the lower face of the respective arm 122xa, 122xb.

With significant advantage, as can be seen from said figures, said tooth means comprise one, in particular a first and a second, engagement gears 242 with a corresponding rack 241, in particular provided at the end with corresponding lever means 243, which normally elastically push the respective toothing 242 in a condition of engagement of the corresponding rack 241.

As can be seen from said figures, advantageously, said lever means 243 comprise a corresponding lever 245 for operating in disengagement of said tooth means 242 from said rack means 241, which lever 245 preferably extends and projects, in particular longitudinally, from said member 10, in particular from the protective body 10' of said rack means 241.

As can be seen from said figures, with significant advantage, said lever means 243 comprise corresponding first and second arms 244, 244 bearing at their ends a corresponding toothing 242, 242 engaging a corresponding rack 241, 241 and in particular forming a single body with said actuating lever 245.

With advantage, as can be seen from said figures, said lever means 243 comprise a corresponding transversal portion 246 from which said first and second arms 244, 244 bearing the respective toothing 242, 242 extend, and, on the opposite side of said actuating lever 245, said transversal portion 246 carrying, or defining, a pivot 247 of articulation to said base 126, in particular to said first and second struts 126x', 126x" thereof, preferably defining a corresponding crosspiece 126y' of the same base 126.

As can be seen from said figures, advantageously, elastic means 26 are provided for pulling said second supporting means movable in a tilting manner 121, 122 according to a respective angular direction and/or according to the opposite angular direction.

As can be seen from said figures, with advantage, said traction elastic means 26 are in the form of one or more traction springs, in particular operating between said transversally extended part 122 and said fixing plate 126 of said fixed support means 12.

Advantageously, as can be seen from said figures, the respective traction spring 26 extends and is engaged to a corresponding radial projection 261 of said transversely extended part 122, and to a corresponding portion 262 of said fixing plate 126, i.e., of the respective first and/or second struts 126x', 126x" of the same base 126.

As can be seen from said figures, advantageously, said radial protrusion 261 of said transversally extended part 122 is arranged between said seat for said transferring gears of the movement of said driving steering wheel 11 and the corresponding outward channel of said electrical and/or data transmission cables 22 for connecting said means 19 that aid the pilot of said vehicle, or watercraft to a corresponding operative or working unit. In particular as illustrated, four radial projections 261 and four of said coupling portions 262 on said fixing base 126 are provided, for corresponding four traction springs 26, which as illustrated are angularly spaced apart from each other by 90°.

Advantageously, as can be seen from said figures, said means 16 for the transmission of motion, or rotation, of said driving steering wheel 11 towards, or to, means for directing said vehicle, or watercraft comprise a cardan member 160 having a first fixed part 161, to rotate with said end gear 202, of said means 20 for transferring the movement, or rotation, and a second articulated part 162, in a cardan-like manner and supported by said first part 161.

Figure 7A:
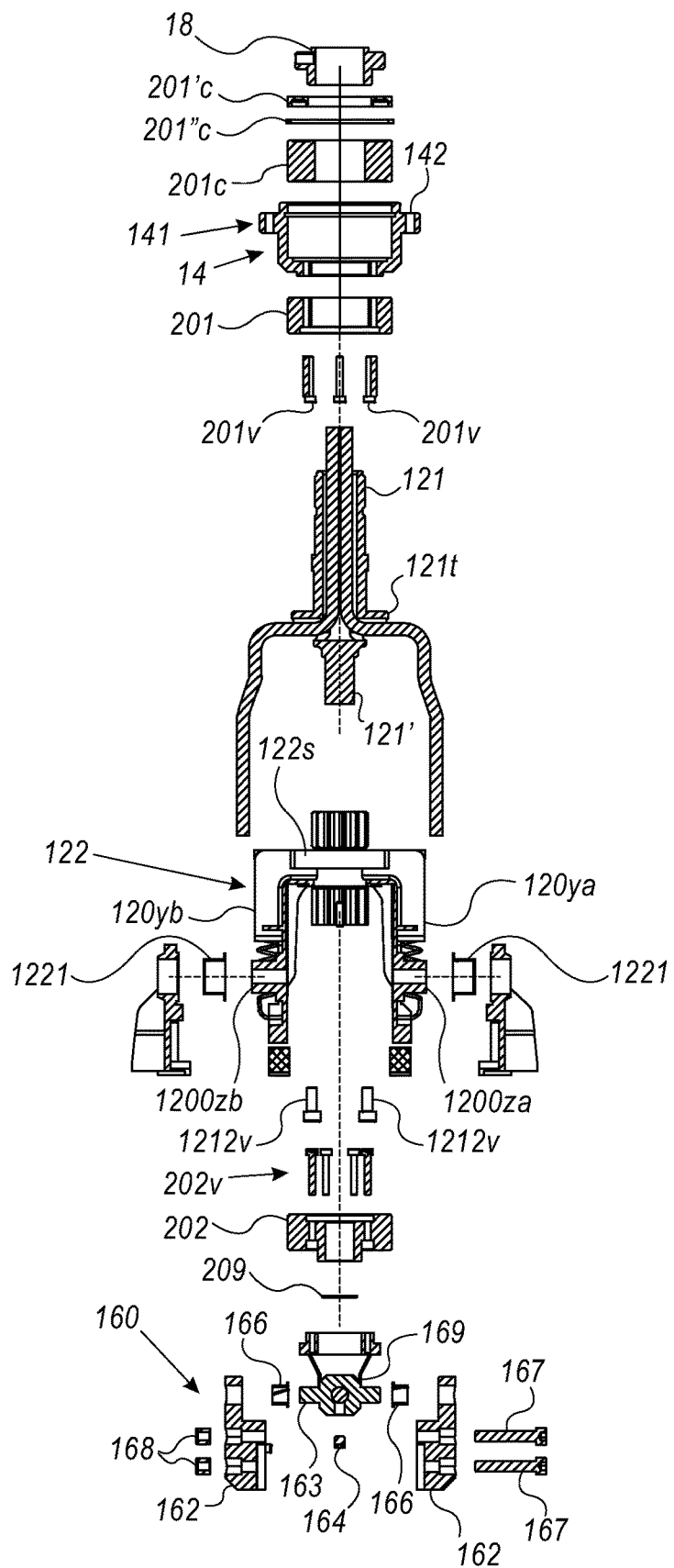
FIG. 7A illustrates an exploded schematic elevated front view of the preferred embodiment of a member according to the present invention.
Figure 7B:
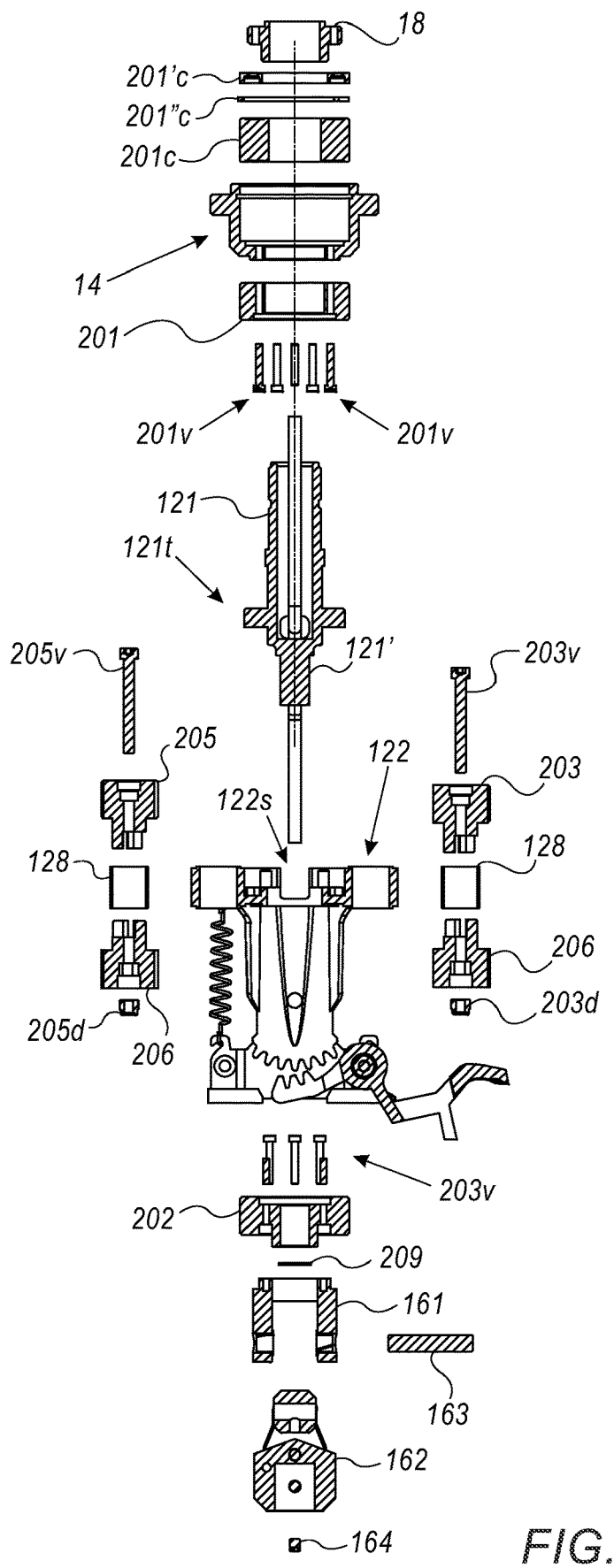
FIG. 7B illustrates an exploded schematic elevated side view of the preferred embodiment of a member according to the present invention.
Figure 8A:
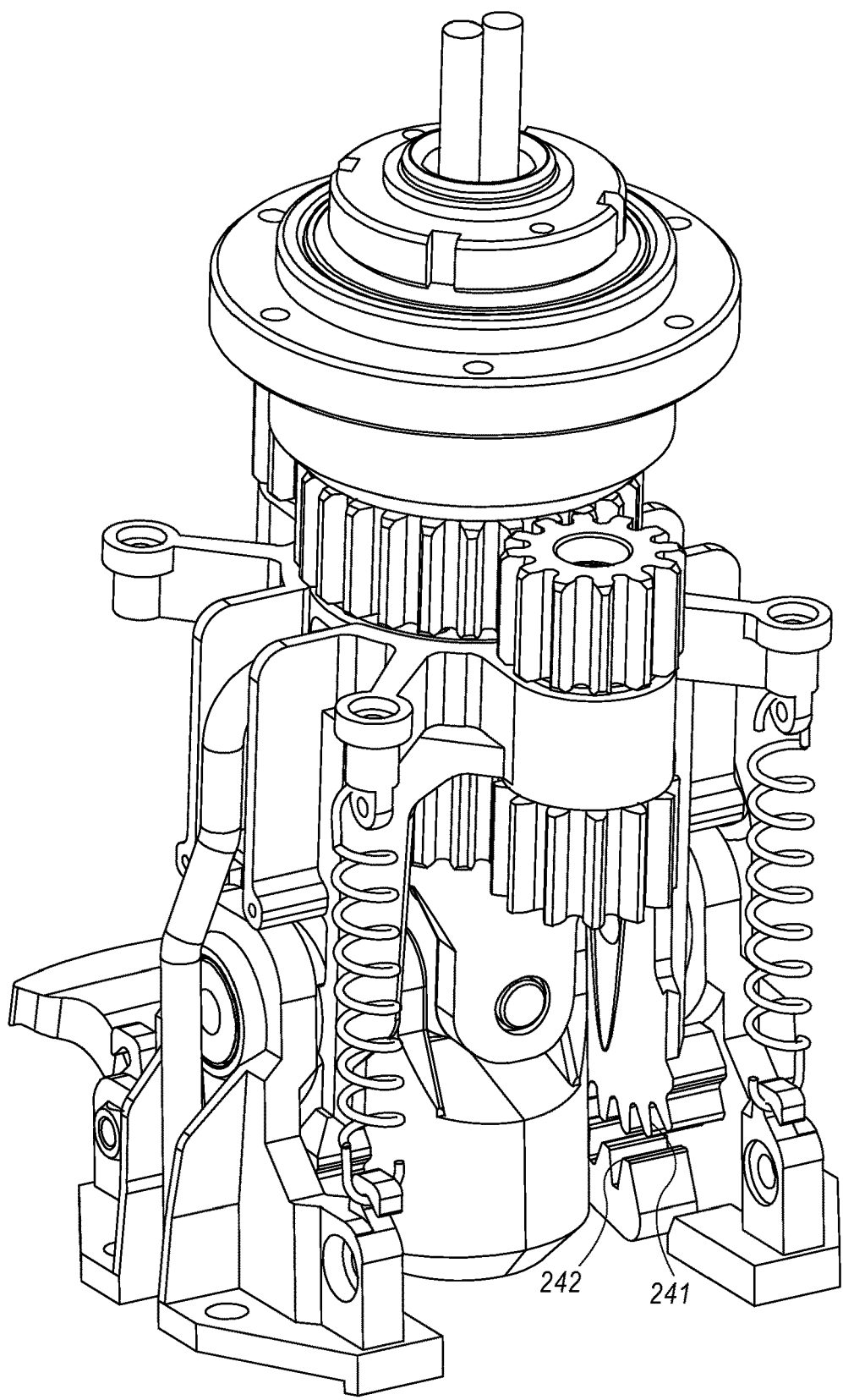
FIGS. 8A and 8B illustrate respective perspective views illustrating retaining means of the tilting of the upper part of the preferred embodiment of a member according to the present invention.
Figure 8B:
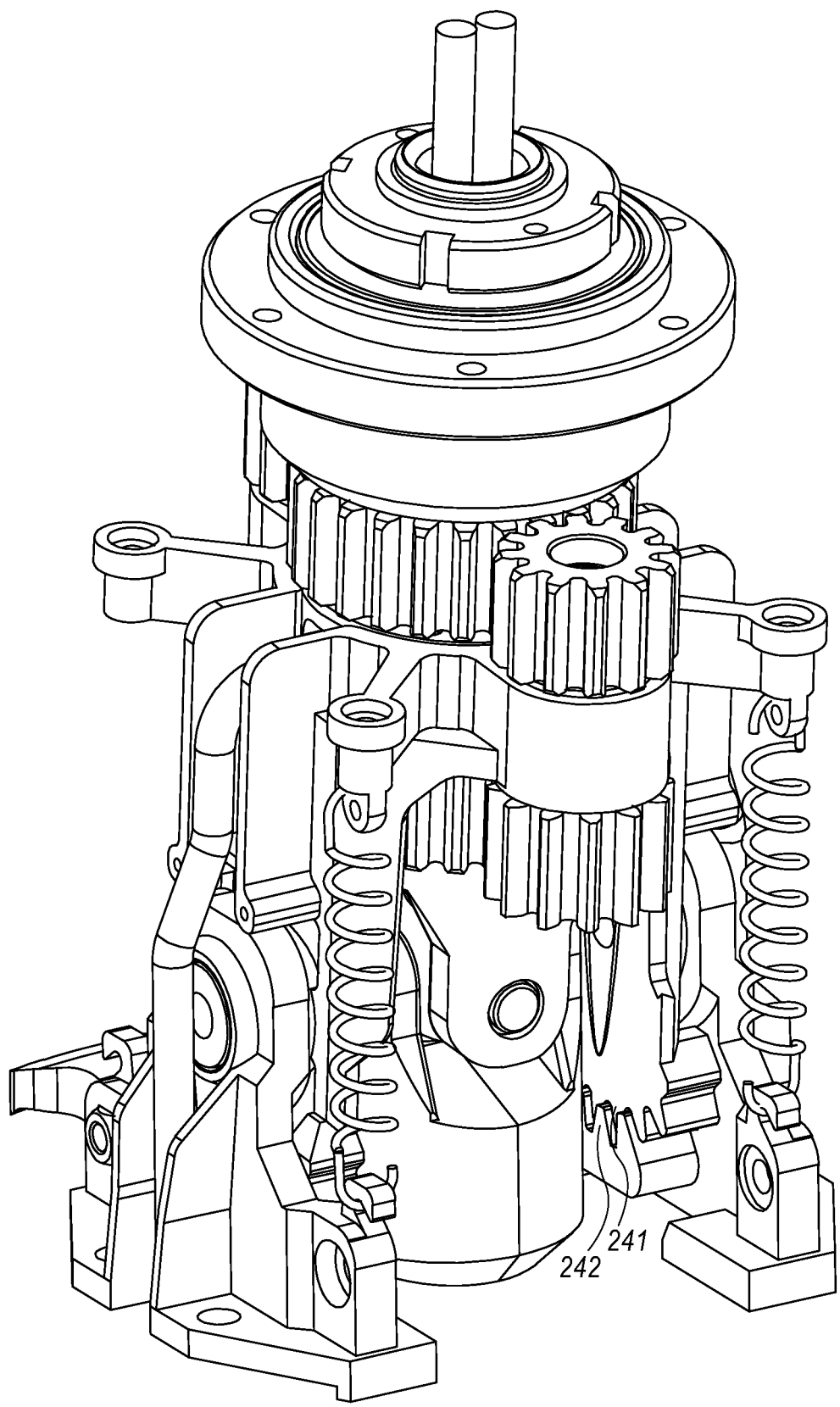

In particular, as can be seen from particularly from the FIGS. 7A and 7B, said first part 161 and said second part 162 of the cardan joint are articulated to each other through a corresponding pin 163 fixed to said first part 161 and held in position by a corresponding spur 164, on which a block 169 rotates, from which a corresponding transversal shaft 165 extends, which is freely rotatable, by means of corresponding bushings 166, 166, into corresponding holes of said second part 162 of the cardan joint. As illustrated, said second part of the cardan joint comprises a first and a second portions 162, 162, which are joined together by corresponding screws 167, 167 and corresponding tightening nuts 168, 168.

Furthermore, as can be seen in particular from FIGS. 7A and 7B, a dust protection element 201'c for said bearing 201c and a Seeger ring 201"c for the retention, in particular longitudinal, of said bearing 201c are provided on said axially extended part 121.

In practice, as is evident, the above-illustrated technical features allow, individually or in a respective combination, to achieve one or more of the following advantageous results:

- a simple and robust structure can be obtained for the present support member;
- it is possible to adjust the position of the driving steering wheel, in particular by inclining it appropriately in relation to the pilot of the vehicle or watercraft.

The present invention is susceptible of evident industrial application. The person skilled in the art can also devise a number of modifications and/or variations to be made to the same invention, while still remaining within the scope of the inventive concept, as widely explained. Furthermore, the person skilled in the art will be able to devise further preferred implementations of the invention, which comprise one or more of the characteristics illustrated herein above of the preferred implementation set forth above. Furthermore, it must also be understood that all the details of the invention can be replaced by technically equivalent elements.

The invention claimed is:

1. A mechanism for supporting a driving steering wheel for a vehicle; said member comprising:
   - a rotationally fixed support member configured for connection to said vehicle;
   - a rotatable support mechanism configured for supporting said driving steering wheel and being rotatable with said driving steering wheel, the rotatable support mechanism being connected to a motion transmission mechanism for directing said vehicle;
   - an electrical piloting system configured to aid piloting of said vehicle;
   - at least one cable configured for electrical and/or data transmission operatively connected to said piloting system and configured to operatively connect said piloting system to an operative and/or working unit of the vehicle for at least power supply and/or data treatment;
   - a carrying mechanism configured to support the piloting system, the carrying mechanism rotationally fixed to retain the piloting mechanism in a stationary rotational position during rotation of said driving steering wheel to allow ease of operation and/or display of the piloting system regardless of a rotational position of said driving steering wheel;
   - wherein said rotationally fixed support member comprises an axially extended part which is adapted to support said rotatable support mechanism and/or said carrying mechanism; and
   - wherein said axially extended part includes an internally hollow portion having a tubular body, and the at least one cable is at least partly positioned in the internally hollow portion.

2. The mechanism according to claim 1, wherein said axially extended part is superiorly open toward the piloting system and/or is laterally open, for passage of the at least one cable to an exterior of the axially extended part.

3. The mechanism according to claim 1, wherein said rotationally fixed support member comprises a transversally extended part defining a support, and/or connector for said axially extended part.

4. The mechanism according to claim 3, wherein said axially extended part has a flanged extending portion, which is adapted to engage with a receiving seat in said transversally extended part.

5. The mechanism according to claim 4, wherein said transversally extended part includes a central hole allow passing through of a lower portion of said axially extended part, said central hole being positioned at said receiving seat provided with said transversally extended part.

6. The mechanism according to claim 1, wherein said rotationally fixed support member comprises a transversally extended part that comprises a passage opening for passage of said at least one cable.

7. The mechanism according to claim 6, wherein said passage opening comprises at least one channel which has a horizontal length from which a subsequent perpendicular length extends downwardly.

8. The mechanism according to claim 1, and further comprising a transfer mechanism configured for transferring rotation of said driving steering wheel to said motion transmission mechanism.

9. The mechanism according to claim 8, wherein said transfer mechanism is supported, in a freely movable manner, by said axially extended part.

10. The mechanism according to claim 8, wherein said transfer mechanism is a geared mechanism.

11. The mechanism according to claim 8, wherein said transfer mechanism comprises a primary gear that receives the movement, or is directly connected, to said driving steering wheel.

12. The mechanism according to claim 11, wherein said primary gear is rotatable with respect to a respective axis that matches with an axis of the mechanism and/or with a rotational axis of said driving steering wheel.

13. The mechanism according to claim 11, wherein said transfer mechanism further comprises an end gear that imparts the movement, or is directly connected, to said motion transmission mechanism.

14. The mechanism according to claim 13, wherein said end gear is rotatable with respect to a respective axis that matches with an axis of the mechanism and/or with a rotational axis of said driving steering wheel, and/or with a rotational axis of said motion transmission mechanism, at least with a part thereof which said end gear is directly connected to.

15. The mechanism according to claim 13, wherein said transfer mechanism further comprises includes a gear set for transferring the movement, or rotation, of said primary gear to said end gear.

16. The mechanism according to claim 15, wherein said gear set comprises at least one upstream gear in operative, meshing, connection, with said primary gear, and at least a downstream gear in operative, meshing, connection, with said end gear; said upstream gear and downstream gear being operatively connected to one another via a rotationally integral, or firm, connection.

17. The mechanism according to claim 16, wherein said at least one upstream gear comprises first and a second, upstream gears in operative connection, meshed, with said primary gear, and said at least one downstream gear comprises first and a second, downstream gears in operative connection, meshed, with said end gear; said respective first and second upstream and downstream gears being angularly spaced from one another at respective opposite sides of said primary gear and end gear.

18. The mechanism according to claim 16, wherein said at least one upstream gear and said at least one downstream gear are rotatable with respect to a corresponding longitudinal axis parallel to the rotational axis of said primary gear and/or of said end gear.

19. The mechanism according to claim 11, wherein said rotationally fixed support member supports in a freely rotatable manner said primary gear.

20. The mechanism according to claim 1, wherein:
the vehicle is a watercraft;
the carrying mechanism and piloting system are positioned higher than at least a portion of the rotatable support mechanism;
the axially extended part passes through an interior of each of the rotatable support mechanism and the carrying mechanism; and
the axially extended part is rotationally fixed with respect to the carrying mechanism.

\* \* \* \* \*